(12) United States Patent
Bae et al.

(10) Patent No.: US 9,321,477 B2
(45) Date of Patent: Apr. 26, 2016

(54) RACK BAR SUPPORT DEVICE OF A STEERING GEAR

(75) Inventors: Seong-Hun Bae, Daegu (KR); Chang-Wook Son, Daegu (KR); Chung-Shin Lee, Daegu (KR); Jin-Woong Lee, Daegu (KR); Je-Won Kim, Daegu (KR)

(73) Assignee: ERAE AUTOMOTIVE SYSTEMS CO., LTD., Daegu (KR)

( * ) Notice: Subject to any disclaimer, the term of this patent is extended or adjusted under 35 U.S.C. 154(b) by 0 days.

(21) Appl. No.: 14/353,674

(22) PCT Filed: Sep. 6, 2012

(86) PCT No.: PCT/KR2012/007152
§ 371 (c)(1),
(2), (4) Date: Apr. 23, 2014

(87) PCT Pub. No.: WO2013/062229
PCT Pub. Date: May 2, 2013

(65) Prior Publication Data
US 2014/0260719 A1  Sep. 18, 2014

(30) Foreign Application Priority Data

Oct. 28, 2011 (KR) .......................... 10-2011-0111154

(51) Int. Cl.
*F16H 19/04* (2006.01)
*B62D 3/12* (2006.01)
*F16H 55/28* (2006.01)

(52) U.S. Cl.
CPC ................ *B62D 3/126* (2013.01); *B62D 3/123* (2013.01); *F16H 55/283* (2013.01); *Y10T 74/18096* (2015.01)

(58) Field of Classification Search
CPC ............. B62D 3/02; B62D 3/126; B62D 3/06
USPC ........... 74/30, 422, 498; 180/428; 280/93.514
See application file for complete search history.

(56) References Cited

U.S. PATENT DOCUMENTS

| | | | |
|---|---|---|---|
| 4,539,857 A | * | 9/1985 | Kako et al. ...................... 74/422 |
| 4,724,717 A | | 2/1988 | Chikuma |
| 4,794,809 A | * | 1/1989 | Kobayashi et al. ............. 74/422 |
| 5,718,149 A | * | 2/1998 | Phillips ........................... 74/422 |

(Continued)

FOREIGN PATENT DOCUMENTS

| | | | | |
|---|---|---|---|---|
| DE | WO2010/069942 | * | 12/2009 | ............... B62D 3/12 |
| JP | H11-286277 A | | 10/1999 | |
| KR | 10-2007-0092018 A1 | | 9/2007 | |

*Primary Examiner* — William Kelleher
*Assistant Examiner* — Zakaria Elahmadi
(74) *Attorney, Agent, or Firm* — Novick, Kim & Lee, PLLC; Jae Youn Kim

(57) ABSTRACT

A rack bar support device supports a rack bar of a steering device of a vehicle toward a pinion shaft, and includes a rack bearing which is disposed opposite the pinion to contact the rack bar and a biasing assembly providing a force of pushing the rack bearing along a biasing axis toward the rack bar to urge the rack bearing to push the rack bar is engaged with the pinion shaft. The biasing assembly includes an adjustment plug, an adjustment assembly and a support plate assembly. The support plate assembly includes a support plate which is movably disposed between the adjustment member and the rack bearing in a state of being supported by the adjustment member, and a gap is formed between the support plate and the rack bearing.

6 Claims, 5 Drawing Sheets

(56) References Cited

U.S. PATENT DOCUMENTS

| | | | |
|---|---|---|---|
| 6,067,713 A * | 5/2000 | Bugosh | 29/893.1 |
| 7,197,956 B2 * | 4/2007 | Bieber et al. | 74/422 |
| 7,487,984 B1 * | 2/2009 | Lemont et al. | 280/93.514 |
| 8,418,576 B2 * | 4/2013 | Bareis | 74/422 |
| 8,899,119 B2 * | 12/2014 | Bareis | 74/89.17 |
| 9,010,208 B2 * | 4/2015 | Urbach | 74/388 PS |
| 2002/0124670 A1 * | 9/2002 | Bugosh | 74/388 PS |
| 2002/0152825 A1 * | 10/2002 | Adams et al. | 74/422 |
| 2004/0108676 A1 * | 6/2004 | Bareis | 280/93.514 |
| 2005/0126328 A1 * | 6/2005 | Piotrowski et al. | 74/492 |
| 2006/0185460 A1 * | 8/2006 | Shiino et al. | 74/422 |
| 2008/0034910 A1 * | 2/2008 | Roline et al. | 74/422 |
| 2008/0034911 A1 * | 2/2008 | Bieber et al. | 74/422 |
| 2008/0202271 A1 * | 8/2008 | Heo | 74/422 |
| 2009/0174164 A1 * | 7/2009 | Kaida et al. | 280/93.514 |
| 2009/0223314 A1 * | 9/2009 | Eickholt | 74/422 |
| 2010/0018337 A1 * | 1/2010 | Kawakubo et al. | 74/422 |
| 2010/0024583 A1 * | 2/2010 | Kawakubo et al. | 74/422 |
| 2010/0122595 A1 * | 5/2010 | Sung et al. | 74/409 |

* cited by examiner

RACK BAR SUPPORT DEVICE OF A STEERING GEAR

FIELD OF THE INVENTION

The present invention relates to a rack bar support device for supporting a rack bar of a steering gear consisting of a steering device of a vehicle.

BACKGROUND ART

A steering device having a steering gear of a rack-pinion type has a structure of an engagement of a rack of a rack bar and a pinion gear of a pinion shaft.

Generally, a rack support structure is provided for maintaining firm engagement of a rack and a pinion to improve a steering performance and a steering feeling.

A rack support structure is provided with a rack bearing which contacts a rack bar, and has a structure that a coil spring which is supported by an adjustment plug which is coupled to a gear housing elastically supports the rack bearing.

In such a conventional rack bar support device a clearance between the rack bearing and the adjustment plug may increase due to abrasion of the rack and the pinion and so on, and the increased clearance may cause rattle, vibration, etc.

DETAILED DESCRIPTION OF THE INVENTION

Technical Problem

The present invention has been made in an effort to provide a rack bar support device which can effectively compensate a clearance due to abrasion caused by long time use of a steering gear of a steering device of a vehicle.

Technical Solution

In an exemplary embodiment of the present invention, a rack bar support device for supporting a rack bar of a steering device of a vehicle toward a pinion shaft includes: a rack bearing which is disposed opposite the pinion to contact the rack bar; and a biasing assembly providing a force of pushing the rack bearing along a biasing axis toward the rack bar to urge the rack bearing to push the rack bar is engaged with the pinion shaft. The biasing assembly includes: an adjustment plug which can be fixed at a plurality of positions along the biasing axis; an adjustment assembly comprising an adjustment member which is formed to move toward the rack bearing along the biasing axis relative to the adjustment plug and a first biasing member which is connected respectively to the adjustment plug and the adjustment member so as to provide a force of pushing the adjustment member toward the rack bearing against the adjustment plug; and a support plate assembly comprising a support plate which is movably disposed between the adjustment member and the rack bearing in a state of being supported by the adjustment member and a second biasing member providing a force of pushing the rack bearing along the biasing axis against the support plate. A gap is formed between the support plate and the rack bearing.

The support plate assembly may further include a movement limitation member which is configured to limit movement of the support plate in a direction opposite the rack bearing.

The support plate may be disposed in an equilibrium state of contacting neither the rack bearing nor the movement limitation member.

The first biasing member may be a torsional spring, the adjustment plug has a cam structure, and the adjustment member may have a second cam structure which is engaged with the first cam structure so as to be movable along the biasing axis toward the rack bearing by a force of the torsional spring.

The second biasing member may be a coil spring which is elastically supported by the rack bearing and the support plate respectively.

The second biasing member may be a Belleville spring which is elastically supported by the rack bearing and the support plate respectively.

An O-ring may be provided between the support plate and the rack bearing.

The adjustment assembly may further include a thrust bearing which is disposed to contact the adjustment member and the support plate respectively.

Advantages Effects

According to a present invention, a clearance due to abrasion caused by long time use of a steering gear of a steering device of a vehicle can be effectively compensated.

BRIEF DESCRIPTIONS OF DRAWINGS

DETAILED DESCRIPTION OF THE EMBODIMENTS

A rack bar support device according to embodiments of the present invention will be described in detail with reference to the accompanying drawings.

Figure 1:
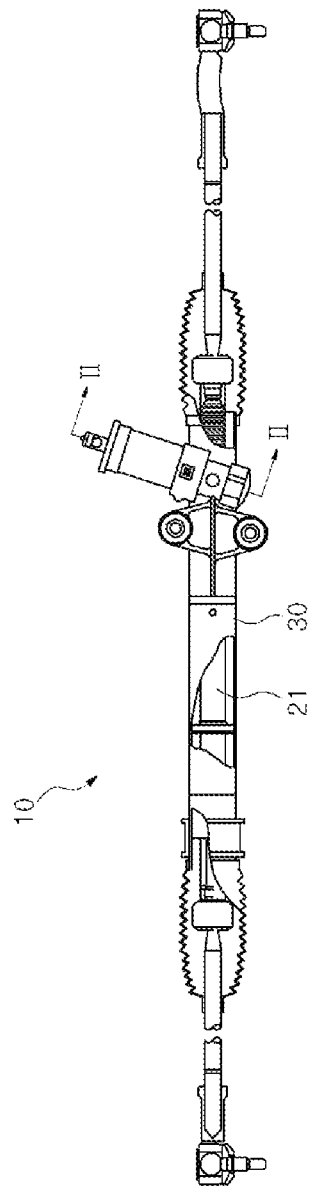
FIG. 1 is a schematic perspective view of a steering gear of a vehicle to which a rack bar support device according to an embodiment of the present invention can be applied.
Figure 2:
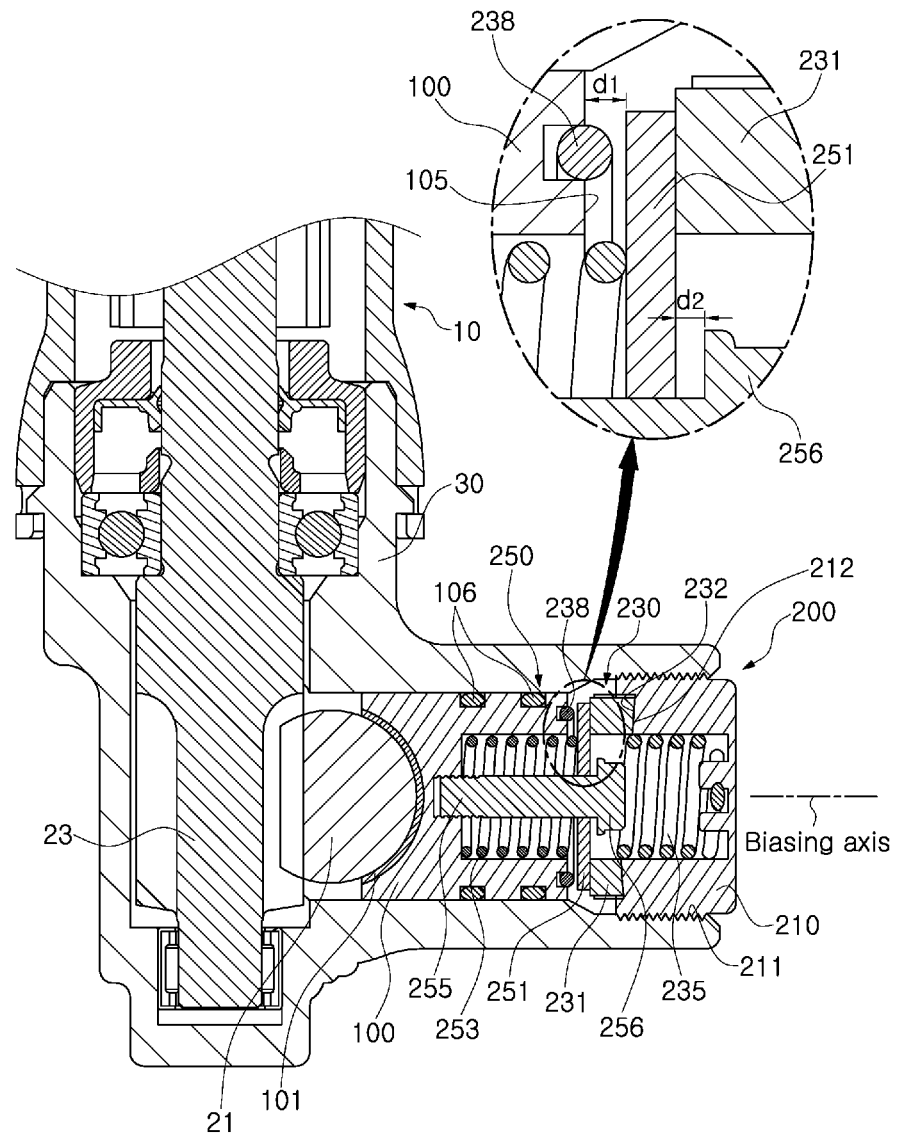
FIG. 2 is a sectional view taken along a line II-II in FIG. 1.
Figure 3:
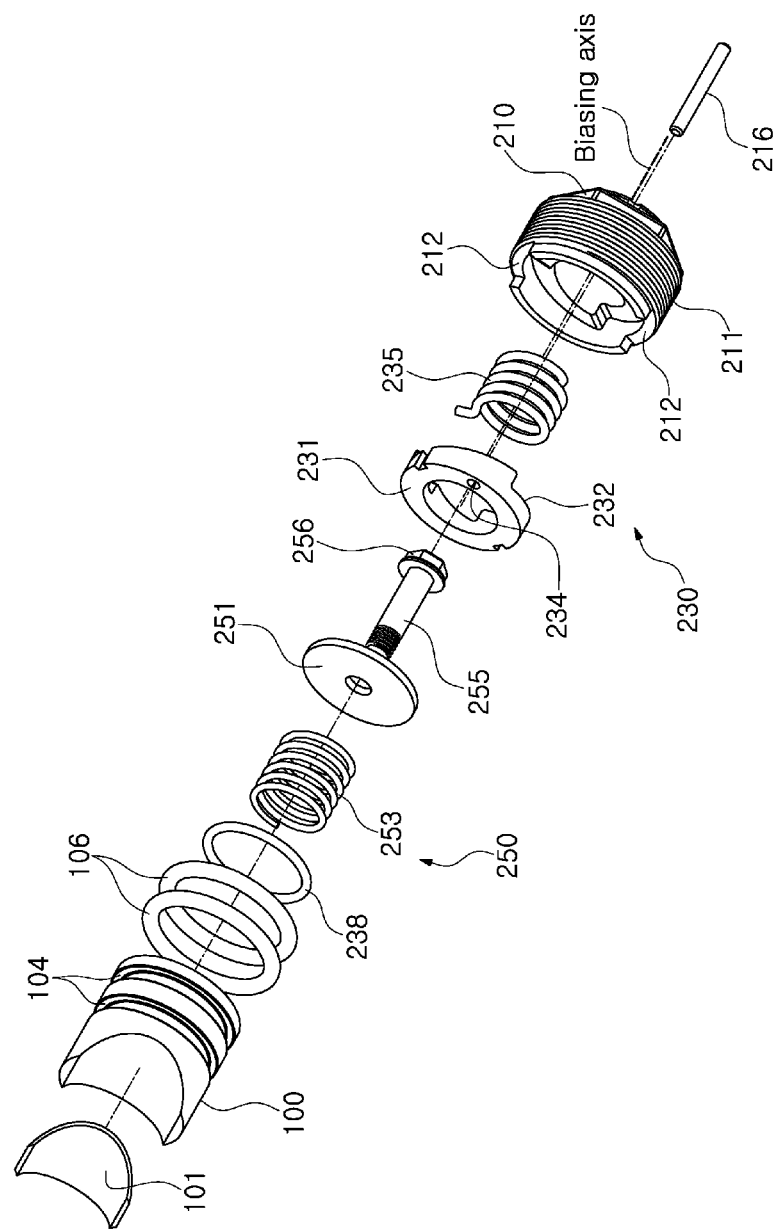
FIG. 3 is an exploded perspective view of a rack bar support device according to an embodiment of the present invention.

FIG. 1 is a schematic perspective view of a steering gear of a vehicle to which a rack bar support device according to an embodiment of the present invention can be applied, FIG. 2 is a sectional view taken along a line II-II in FIG. 1, and FIG. 3 is an exploded perspective view of a rack bar support device according to an embodiment of the present invention.

Referring to FIG. 1 and FIG. 2, a rack bar support device according to an embodiment of the present invention supports a rack bar 21 of a steering gear 10 of a steering device of a vehicle toward a pinion shaft 23. In addition, a rack bar support device according to an embodiment of the present invention plays a role of compensating to absorb a clearance which may be produced by abrasion of a rack gear and a pinion gear due to long time use thereof.

The pinion shaft 23 is engaged with the rack bar 21, and the pinion shaft 23 and the rack bar 21 are at least in part disposed within a housing 30. The pinion shaft 23 is installed to be rotatable, and the rack bar 21 is installed to be laterally movable in response to rotation of the pinion shaft 23.

A rack bearing 100 contacts the rack bar 21 and is disposed opposite the pinion shaft 23. As shown exemplarily in the drawing, one side of the rack bearing 100 is indented to receive the rack bar 21 at least in part, and the rack bar 21 is inserted into the indented portion. Further, a lining 101 may be provided at a position of contacting the rack bar 21 such that the rack bar 21 can smoothly move in a state of contacting the rack bearing 100.

As shown in FIG. 2 and FIG. 3, a groove 104 is formed on an outer circumferential surface of the rack bearing 100, and an O-ring 106 for damping is inserted thereinto.

A biasing assembly 200 provides a force of pushing the rack bearing 100 along a biasing axis toward the rack bar 21 such that the rack bearing 100 pushes the rack bar 21 to be engaged with the pinion shaft 23. That is, the biasing assembly 200 pushes the rack bearing 100 and accordingly the rack bar 21 is pushed by the rack bearing 100, so the rack bar 21 and the pinion shaft 23 are firmly engaged with one another so that a clearance therebetween can be absorbed.

Referring to FIG. 2 and FIG. 3, the biasing assembly 200 may include an adjustment plug 210, an adjustment assembly 230 and a support plate assembly 250.

The adjustment plug 210 is formed so as to be fixed at a plurality of positions along a biasing axis. For example, a screw thread 211 is formed on an outer circumferential surface of the adjustment plug 210, and the adjustment plug 210 can be coupled to a through hole of the housing 30 having a screw thread therein via the screw thread 211. Accordingly, a position of the adjustment plug 210 along the biasing axis can be varied depending on the rotation thereof and can be fixed at a desired position.

The adjustment assembly 230 may include an adjustment member 231 and a first biasing member 235.

The adjustment member 231 is formed to be movable toward the rack bearing 100 relative to the adjustment plug 210 along the biasing axis. For example, as shown in FIG. 2 and FIG. 3, the adjustment member 231 may be realized as a member having a through hole at a center thereof along the biasing axis.

The first biasing member 235 is connected to the adjustment plug 210 and the adjustment member 231 respectively so as to apply a force of biasing the adjustment member 231 toward the rack bearing 100 against the adjustment plug 210. For example, as shown in FIG. 2 and FIG. 3, the first biasing member 235 may be formed as a torsional spring.

At this time, the adjustment plug 210 may be provided with a space for receiving the torsional spring 235, and one end of the torsional spring 235 is fixed to the adjustment plug 210 and the other end thereof is fixed to the adjustment member 231. In addition, the adjustment plug 210 and the adjustment member 231 are respectively provided with cam structures 212 and 232, and the adjustment member 231 is rotated by a force applied from the torsional spring 235 and at this time the adjustment member 231 moves away from the adjustment plug 210 by the cam structures 212 and 232.

The support plate assembly 250 may include a support plate 251 and a second biasing member 253.

The support plate 251 is movably disposed between the adjustment member 231 and the rack bearing 100 in a state of being supported by the adjustment member 231. That is, the right side of the support plate 251 in FIG. 2 is supported by the adjustment member 231.

The second biasing member 253 provides a force of pushing the rack bearing 100 against the support plate 251 along the biasing axis. That is, the rack bearing 100 is pushed toward the rack bar 21 by a force of the second biasing member 253 which is supported by the support plate 251. For example, the second biasing member 253 may be realized as a coil spring, and the coil spring 253 may be inserted into an indentation portion which is formed on one side of the rack bearing 100.

At this time, it is configured such that a gap d1 is formed between the support plate 251 and the rack bearing 100. Accordingly, except the case that there is a very big shock transmitted through the rack bar 21, the support plate 251 does not directly collide with the rack bearing 100, so noise and shock can be prevented.

Meanwhile, the support plate assembly 250 may further include a movement limitation member 255 which is formed to limit the movement of the support plate 251 in a direction opposite the rack bearing 100. For example, as shown in FIG. 2 and FIG. 3, the movement limitation member 255 may be connected to the rack bearing 100 and may be realized as a bolt having a head 256. At this time, a screw thread of the bolt 255 is engaged with the rack bearing 100, and the head 256 is disposed beyond the support plate 251. In detail, a through hole is formed at a center portion of the support plate 251, and the screw thread of the bolt 255 passes through the through hole and is engaged with the rack bearing 100. Since the position of the head 256 of the bolt 255 is fixed relative to the rack bearing 100, the support plate 251 which is pushed by the coil spring 253 cannot move beyond a position where it contacts the head 256 of the bolt 255.

Due to this structure, one side of the support plate 251 is supported by the adjustment member 231 and the other side thereof is supported by the coil spring 253, and at this time at an initial installation state (i.e., an initial state without abrasion of the rack and the pinion) the support plate 251 may be disposed in an equilibrium state in which it contacts neither the rack bearing 100 nor the movement limitation member 255. That is, as shown in FIG. 2, it is configured such that there is a gap d1 between the support plate 251 and the rack bearing 100 and there is also a gap d2 between the support plate 251 and the head 256 of the bolt 255. This arrangement can be set by regulating an elastic force of the coil spring 253, an elastic force of the torsional spring 235, a position of the adjustment plug 210 including the cam structure and so on.

At this time, before the support plate 251 is installed in a state of being supported by the adjustment member 231, i.e., in a state that the rack bearing 100 and the support plate assembly 250 connected thereto is a single part, a gap between the support plate 251 and the rack bearing 100 is not d1 in FIG. 1 but a sum of d1 and d2. That is, in that case, the support plate 251 is disposed to be farthest from the rack bearing 100 by the coil spring 253, that is, the support plate 251 is in a state of contacting the head 256 of the bolt 255.

In other words, the support plate 251 is separated from the rack bearing 100 by a distance corresponding to the sum of d1 and d2 before it is installed in a state of being supported by the adjustment member 231, and during the installation it is pushed by the adjustment member 251 to be located at a position apart from the rack bearing 100 by a distance of d1. At this time, the support plate 251 is separated from the head 256 of the bolt 255 by a distance of d2.

For example, the adjustment assembly 230 is assembled in a state that the adjustment plug 210 and the adjustment member 231 are twisted with respect to one another by the torsional spring 235, and at this time it can be assembled in a state of maintaining the twisted state by inserting a pin 216 (referring to FIG. 3) into a hole formed in the adjustment plug 210 and a hole 234 formed in the adjustment member 231. That is, the adjustment assembly 230 is assembled to have a minimum height to form a single assembly, and the adjustment assembly 230 is connected to the housing 30 via screw engagement of the adjustment plug 210, and if the adjustment member 231 is assembled at a suitable position to contact the support plate assembly 250 to form suitable d1 and d2, the pin 216 is pulled out so as to cause the adjustment member 231 to rotate by the torsional spring 235. Accordingly, the rotation due to the torsional spring 235 does not occur during the assembling process, but occur after the final assembling.

Meanwhile, according to an embodiment of the present invention, an O-ring 238 may be interposed between the support plate 251 and the rack bearing 100. For example, the O-ring 238 may be disposed on a surface 105 of the rack bearing 100 facing the support plate 251. By the O-ring 238, the rack bearing 100 is prevented from directly colliding with the support plate 251 when a great shock is transmitted. Accordingly, shock and noise can be prevented.

The rack bar support device having these constructions acts as follows. First, if there is a clearance due to abrasion of the rack and the pinion by long time use of a steering device after an initial installation, the rack bearing 100 moves toward to rack bar 21 by a pushing force of the coil spring 253 which is supported by the support plate 251 so as to absorb a clearance. At this time, the bolt 255 which is coupled to the rack bearing 100 moves also toward the rack bar 21 along a biasing axis together with the rack bearing 100. If the bolt 255 moves by a distance d2 after this process lasts for some period, the head 256 of the bolt 255 contacts the support plate 251. After that point, if there is a further abrasion so that there occurs a clearance between the rack and the pinion, the adjustment member 231 rotates by a force of the torsional spring 235 so as to move along the biasing axis in a direction of absorbing the generated clearance and as a result the support plate 251 moves together, and accordingly the coil spring 253 biases the rack bearing 100 to move so that the generated clearance is absorbed. As such, according to an embodiment of the present invention, a clearance absorbing mechanism of two stages occurs, so clearance compensation can be effectively performed.

Figure 4:
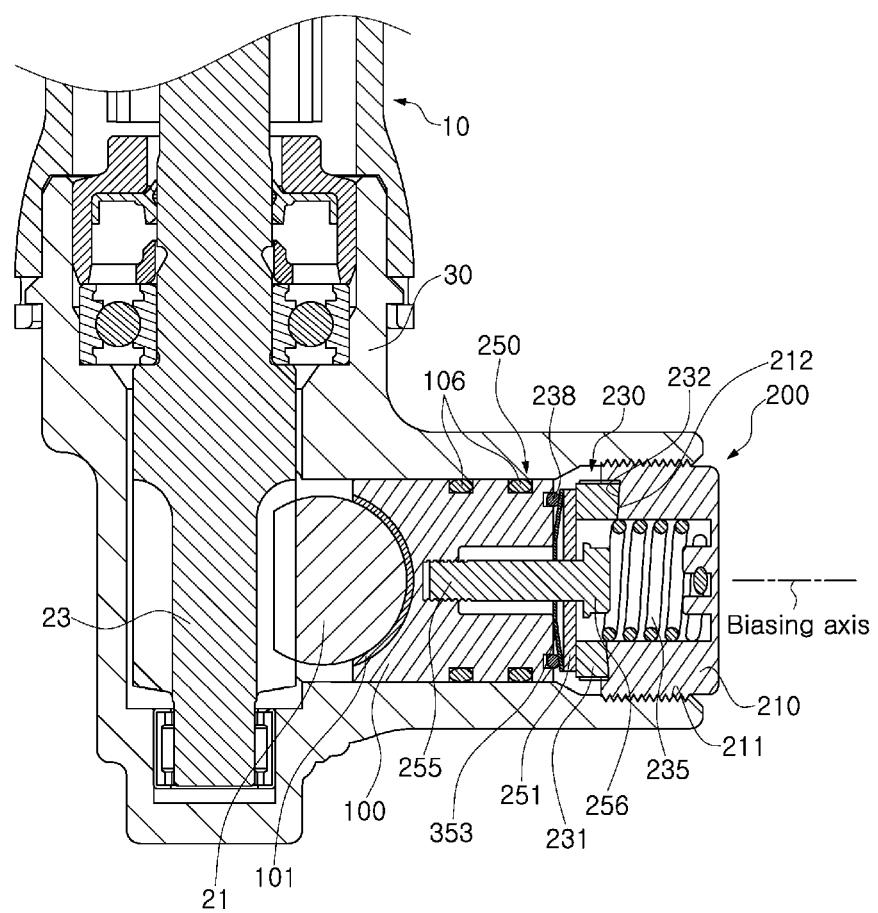
FIG. 4 is a sectional view of a rack bar support device according to another embodiment of the present invention.

FIG. 4 is a sectional view of a rack bar support device according to another embodiment of the present invention.

Referring to FIG. 4, according to another embodiment of the present invention, the second biasing member is realized by a Belleville spring 353 instead of a coil spring. At this time, as shown in FIG. 4, the Belleville spring 353 may be elastically supported by the rack bearing 100 and the support plate 251.

Figure 5:
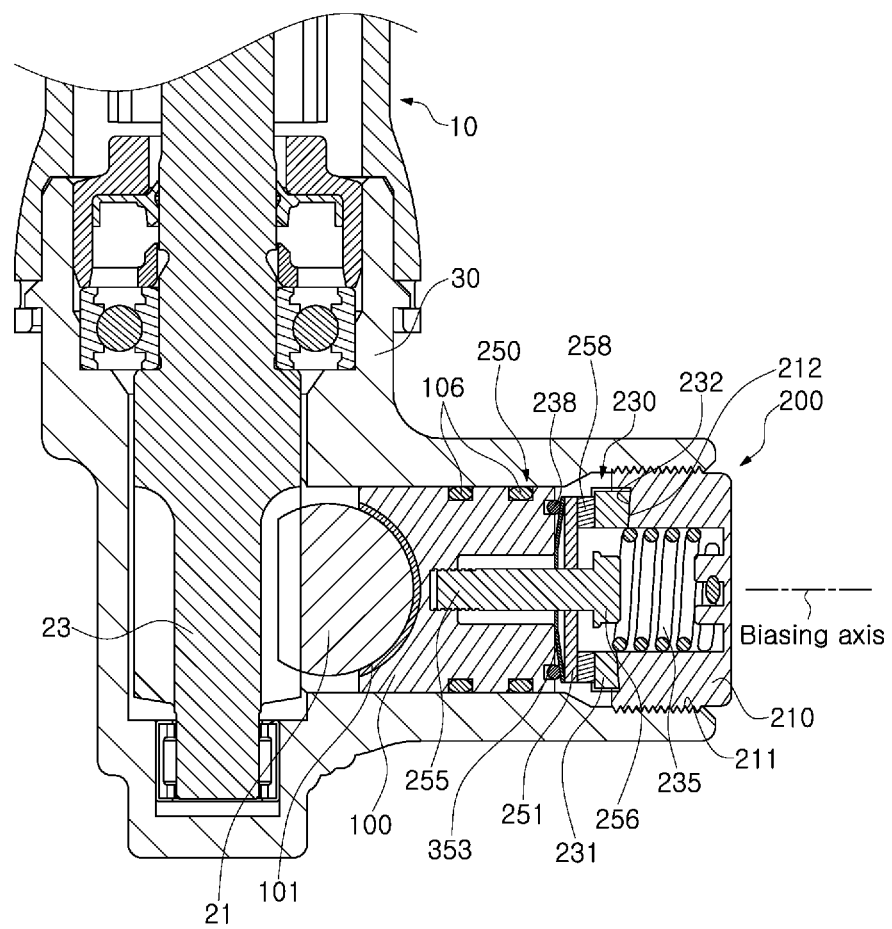
FIG. 5 is a sectional view of a rack bar support device according to yet another embodiment of the present invention.

FIG. 5 is a sectional view of a rack bar support device according to yet another embodiment of the present invention.

According to this embodiment, the adjustment assembly 230 may further include a thrust bearing 258 which is disposed to contact the adjustment member 231 and the support plate 251 respectively. In this case, the above-described force of the adjustment member 231 is transmitted to the support plate 231 via the thrust bearing 258. Although the second biasing member is exemplarily shown as a Belleville spring, the thrust bearing can be provided even in case that the second biasing member is a coil spring. Since the thrust bearing 258 is provided, friction which is generated while the adjustment member 258 rotates to push the support plate 231 can be reduced so that smooth operation can be possible.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The present invention relates to a rack bar support device of a steering gear and can be applied to a steering apparatus of a vehicle, so has an industrial applicability.

The invention claimed is:

1. A rack bar support device for supporting a rack bar of a steering device of a vehicle toward a pinion shaft, comprising:
a rack bearing which is disposed opposite the pinion to contact the rack bar; and
a biasing assembly providing a force of pushing the rack bearing along a biasing axis toward the rack bar to urge the rack bearing to push the rack bar which is engaged with the pinion shaft,
wherein the biasing assembly comprises:
an adjustment plug which can be fixed at a plurality of positions along the biasing axis;
an adjustment assembly comprising an adjustment member which is configured to move toward the rack bearing along the biasing axis relative to the adjustment plug and a first biasing member which is connected respectively to the adjustment plug and the adjustment member so as to provide a force of pushing the adjustment member toward the rack bearing against the adjustment plug; and
a support plate assembly comprising a support plate which is movably disposed between the adjustment member and the rack bearing in a state of being supported by the adjustment member and a second biasing member providing a force of pushing the rack bearing along the biasing axis against the support plate,
wherein the support plate assembly further comprises a movement limitation member which is connected to the rack bearing and has a head configured to limit movement of the support plate in a direction opposite the rack bearing, and
wherein the support plate, in an initial installation state, is disposed in an equilibrium state of contacting neither the rack bearing nor the head of the movement limitation member such that a first gap exists between the support plate and the rack bearing and a second gap exists between the support plate and the head of the movement limitation member.

2. The rack bar support device of claim 1, wherein the first biasing member is a torsional spring, the adjustment plug has a first cam structure, and the adjustment member has a second cam structure which is engaged with the first cam structure so as to be movable along the biasing axis toward the rack bearing by a force of the torsional spring.

3. The rack bar support device of claim 1, wherein the second biasing member is a coil spring which is elastically supported by the rack bearing and the support plate respectively.

4. The rack bar support device of claim 1, wherein the second biasing member is a Belleville spring which is elastically supported by the rack bearing and the support plate respectively.

5. The rack bar support device of claim 1, wherein an O-ring is provided between the support plate and the rack bearing.

6. The rack bar support device of claim 1, wherein the adjustment assembly further comprises a thrust bearing which is disposed to contact the adjustment member and the support plate respectively.

* * * * *